United States Patent [19]

Airey et al.

[11] Patent Number: 5,407,474

[45] Date of Patent: Apr. 18, 1995

[54] INK JET PRINTER INK FOR PRINTING ON CERAMICS OR GLASS

[75] Inventors: Anthony C. Airey, Oakhill; Mark E. Crooks, Fenton; Robert D. Brett, Penkhull, all of United Kingdom

[73] Assignee: British Ceramic Research Limited, Staffordshire, England

[21] Appl. No.: 108,586

[22] PCT Filed: Feb. 26, 1992

[86] PCT No.: PCT/GB92/00342

§ 371 Date: Aug. 25, 1993

§ 102(e) Date: Aug. 25, 1993

[87] PCT Pub. No.: WO92/15648

PCT Pub. Date: Sep. 17, 1992

[30] Foreign Application Priority Data

Feb. 27, 1991 [GB] United Kingdom ............... 9104171

[51] Int. Cl.⁶ .................................. C09D 11/00
[52] U.S. Cl. .................. 106/20 C; 106/20 D
[58] Field of Search ............. 106/20 C, 20 D, 23 C

[56] References Cited

U.S. PATENT DOCUMENTS

| | | | |
|---|---|---|---|
| 4,365,035 | 12/1982 | Zabiak | 524/283 |
| 4,597,794 | 7/1986 | Ohta et al. | 106/20 C |
| 4,680,058 | 7/1987 | Shimizu et al. | 106/23 |
| 4,863,517 | 9/1989 | Hang et al. | 106/20 C |

FOREIGN PATENT DOCUMENTS

0412548A2  2/1991  European Pat. Off. ...... C09D 11/00

*Primary Examiner*—Helene Klemanski
*Attorney, Agent, or Firm*—W. Thad Adams, III

[57] ABSTRACT

A pigmented ink usable in an ink jet printer in which the maximum particle size of the pigment is sufficiently small not to block the nozzles or the filters of the printer and the particle size range is sufficiently narrow for the ink to have a low viscosity for the printer to operate. The ink is particularly suited for printing on ceramics or glass.

22 Claims, 1 Drawing Sheet

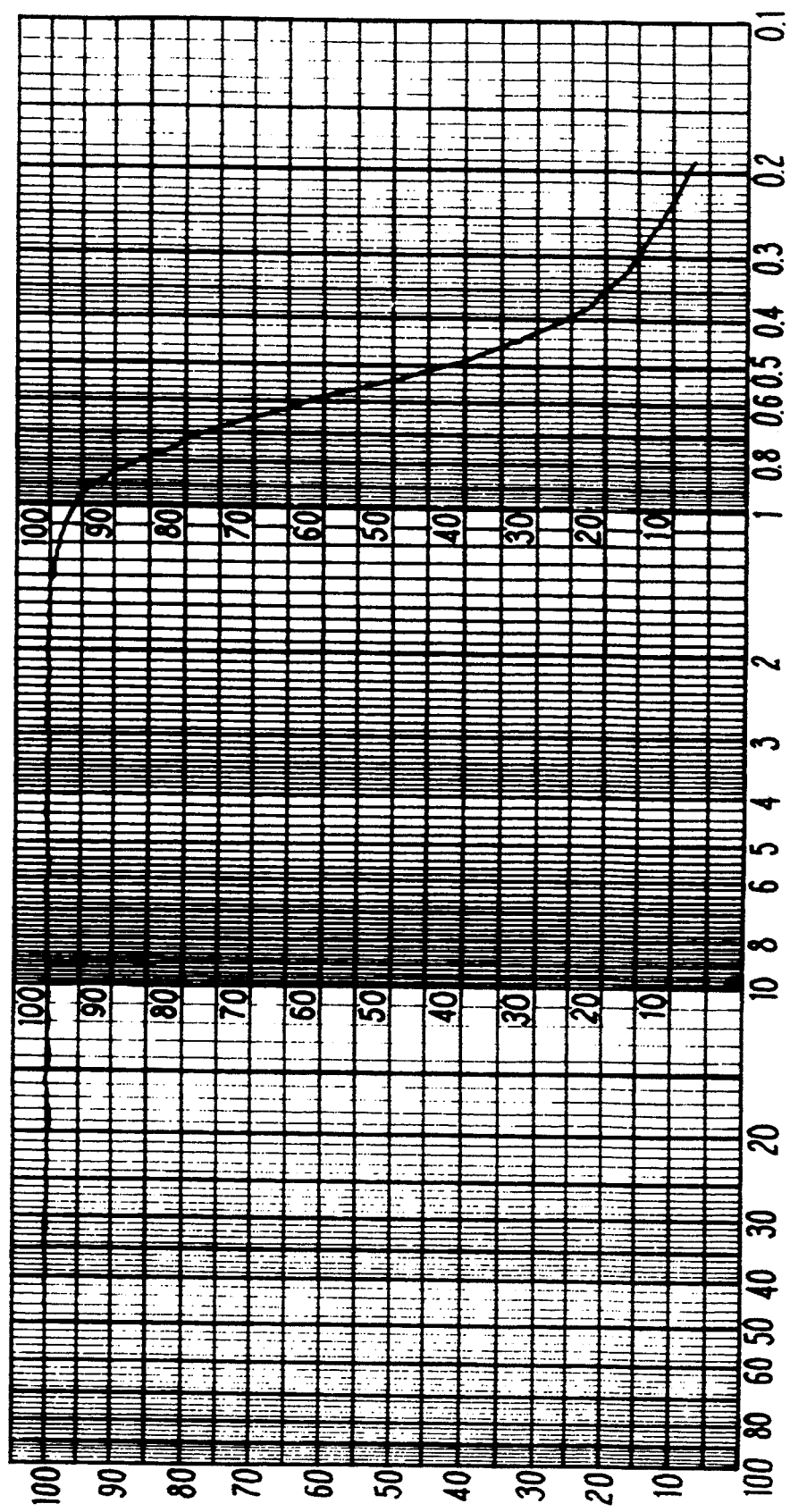

INK JET PRINTER INK FOR PRINTING ON CERAMICS OR GLASS

This application is a PCT application. This application claims the priority date of Feb. 27, 1991 for Great Britain Patent No. GB 9104171.5.

This invention concerns improvements in or relating to inks and particularly but not exclusively pigmented inks for use in ink jet printing.

Modern trends in printing are towards non-contact systems using computer generated and/or computer controlled designs. Such a system is Ink Jet Printing which is used widely through out the textile, paper and food industries. Ink Jet Printing offers major advantages as outlined below:

1. It is non-contact which means the printer does not at any time come in contact with the substrate and since only the drops of ink are projected onto the surface then the print design can be applied to any plane surface and to uneven and delicate surfaces. The technique is already used to print onto delicate foodstuffs e.g. eggs, cakes etc. Also printing distances can be anything from 1-20 mm depending on the quality required. The usual is from 1-5 mm so surfaces such as corrugated cardboard present no problems.
2. Versatility—Designs can be computer generated and/or computer controlled. This means that designs can be changed rapidly and can be manipulated, magnified or reduced as desired. With such a system it is possible carry out short runs or to change from design to design rapidly, as no down time is required
3. High speed—The actual speed achieved depends on various factors including the ink properties and the quality required but typical speeds are between 0.25 and 6 meters/sec.
4. Multicolour—Theoretically there is no limit to the numbers of colours that can be used providing one has a computer powerful enough to control the jets. Recent developments have produced 100 nozzle systems generating over 6 million drops/sec. all being controlled by a computer.
5. Reliability—Ink jet printers have no moving parts and hence they are inherently reliable. At present there are systems which are working continuously for 100 h/week without any down time.
6. No ink wastage—Any ink not used is recirculated to be used again. The only ink used is on the design.

Up to now, the inks used in these ink jet printers have been based on soluble organic dyes usually in an organic medium. The reason for this is that the ink jet printing nozzle is very small usually between 10 and 100 microns and it has not been technically feasible to consider the use of highly pigmented inks in these systems, as the solid particles rapidly block the system and prevent flow.

The soluble dye inks work well in ink jet printing but suffer from the major drawbacks of non-permanency (fading in daylight) after application. They tend to fade rapidly and after a time virtually disappear.

There is a need, therefore, for permanent inks and one way to achieve this is to use pigmented inks, where the pigment is usually a light stable, inorganic or organic colour.

In certain applications the need to use pigmented inks is paramount. For example in the decoration of ceramics and glass, pigmented inks are essential. In most other printing applications once the design has been printed, the decoration process is complete. However, in ceramics and glass decoration, printing is followed by a high temperature firing after which only the pigment and flux remains to form the permanent decoration, all media and organics are burnt off.

In certain other applications e.g. computing and banking a 'magnetic' ink is required usually comprising of a ferromagnetic pigment in a medium which is capable of being read rapidly by a magnetic sensor.

Other applications require resistance to fading (Permanency). For example legal documents, household textiles and artifacts e.g. wallpaper etc. In all these applications a high degree of permanency is required and this can only be achieved by the use of pigmented inks.

Still further, certain colours e.g. opaque can only be achieved by the use of pigments.

Typical ranges of physical parameters required of an ink for it to be suitable for ink jet printing are shown below.

| | |
|---|---|
| Viscosity | 1–100 mPas |
| Yield Value | 0–10 Pa |
| Conductivity | 150–16000 μmhos/cm |
| Surface Tension | 20–70 dynes/cm |
| pH | 4–11 |

As can be seen, the viscosity generally has to be low, to ensure that the ink will flow easily through the nozzle without having to apply excessive pressure which can cause splash back or 'splatter' from the workpiece. There can also be trouble with break up into droplet modulation. The surface tension also has to be within limits to allow uniform break up into equally spaced equally sized droplets. This parameter, however is not so critical as the conductivity which ideally is within the range 150–16000 μmhos/cm to enable the droplets to be charged satisfactorily. The pH should be maintained between 4 and 11 to avoid damage to the equipment.

The presence of large amounts of pigment particles in the ink can seriously affect any of these parameters. The introduction of pigment additions to these systmes normally increases viscosity to unacceptable levels. Also if the pigment is poorly dispersed this can lead to variable modulation and charging, often the pigment itself is more conducting than the medium and poor disperson can lead to variable conductivity which in turn gives erratic charging of droplets and loss of printing control. Furthermore many inorganic pigments tend to be very hard materials and at such high loadings abrasion of the nozzles can be a problem. All these factors can lead to variable ink jet printing characteristics and all have to be controlled precisely to ensure good quality printing.

In the specification all the percentages shall be expressed as weight percent.

According to the present invention there is provided an ink comprising an inorganic pigment and usable in an ink jet printer for printing on to ceramics or glass to provide a decoration thereon following subsequent firing in which the maximum particle size of the pigment is sufficiently small not to block the nozzles or the filters of the printer, and the particle size range is sufficiently narrow for the ink to have a low enough viscosity for the printer to operate.

The median particle size of the pigment is preferably between 0.2 and 2 microns and desirably the pigment has a surface area of between 4 and 30 $m^2/g$.

For use with a 50 micron nozzle the maximum particle size of the pigment is preferably below 4 microns, and desirably less than 20% of the particles of pigment are less than 0.2 microns.

Pigments other than carbon black or titania based pigments are preferably provided in the ink. The proportion of pigment in the ink is preferably in the range 1–85% and desirably 20–60%.

The ink preferably comprises greater than 15% of a medium. The medium is preferably a polar solvent and can be any of water, methyl ethyl ketone, alcohol or a mixture of these, The ink also preferably comprises one or more of the following constituents in the range given:

|  | WT. % |
|---|---|
| Surfactant/Dispersing agent | 0–20 |
| Suspending Agent | 0–10 |
| Film Former/Binder/Hardener | 0–20 |
| Humectant | 0–20 |
| Chelating agent | 0–1 |
| Biocide | 0–1 |
| Defoaming agent | 0–1 |
| Buffering agent | 0–1 |
| Anti wicking agent or | 0–20 |
| Substrate penetrant | 0–5 |

The surfactants/dispersing agents may be wetting agents and may comprise:

For aqueous systems, sodium polyphosphate and/or sodium carboxylic acid;

For organic systems, triethanolamine and/or dimethylethanolamine salt.

The film formers/binder/hardener may comprise one or more of:

resins, rosins, esterified resins, acrylic, styrene acrylic, cellulose, amides, epoxies.

The humectant may be polyethylene glycol (PEG). The chelating agent may comprise EDTA.

The biocides may be Formalin or one of the acticide range of biocides. The defoaming agents may comprise low molecular weight silicones.

The invention also provides an ink usable in an ink jet printer for printing on to ceramics or glass to provide a decoration thereon following subsequent firing, the ink comprising an inorganic pigment according to any of the preceding ten paragraphs with a particle size sufficient to maintain a required colour intensity; and a Flux also with a maximum particle size sufficiently small not to block the nozzles or filters of the printer and a particle size range which is sufficiently narrow such that the ink has a low enough viscosity to operate in the printer.

The invention will now be described in more detail and with reference to examples of inks according to the present invention.

The properties of the pigment used, are crucial to performance. The main parameters for characterising the pigment (or flux) are:

1. Median particle size
2. Particle size distribution
3. Surface area

The median particle size should be between 0.2 and 2 microns and surface areas between 4 $m^2/g$ and 30 $m^2/g$ are desirable.

The maximum particle size is dependent on the filters and nozzle used but generally should be less than 4 microns for a 50 micron nozzle. Greater than this the particles tend to clog the filters and block the nozzle. Also the larger particles have more tendency to sediment in the lines or print head causing erratic behaviour and eventual blockage.

The minimum particle size is determined by the viscosity limit in the specification. The finer the particles the higher the viscosity becomes and thus too many fine particles can be undesirable. Typically for a 50 micron nozzle less than 20% of the particles should not be less than 0.2 microns.

Therefore what is required is a pigment with a narrow particle size distribution as is shown in the accompanying figure. This distribution can only be achieved using special grinding techniques, classification or precipitation.

BRIEF DESCRIPTION OF THE DRAWINGS

The accompanying FIGURE shows a particle size distribution for an inorganic pigment usable in an ink according to the invention. The vertical axis shows cumulative mass percent whilst the horizontal axis shows equivalent spherical diameter in microns.

The actual size range used in practice is determined by the nozzle diameter and filters used and these are selected according to the quality of printing required.

As well as closely monitoring the particle size distribution of the pigment the characteristics such as viscosity or yield value of the ink can be improved by the provision of one or more additional components as outlined below.

1. Surfactant/Dispersing agents—to facilitate even distribution of pigment throughout the medium to ensure uniform modulation and charging.
2. Suspending agents—to stabilize the ink by preventing sedimentation of the pigment suspension.
3. Film formers, binders and hardeners to keep colour together when dry i.e. to prevent powdering, and to give handleability and scratch resistance of the print.
4. Humectants to prevent premature drying of the ink and build up of solids around nozzle.
5. Chelating agents—these are present to control the effect of polyvalent ions.
6. Biocides—to prevent bacterial action and subsequent degradation of the system.
7. Defoaming agents—to prevent bubble entrapment which leads to jet instability.
8. Anti-wicking agents—to control spread of ink into the substrate.
9. Substrate penetrants—enhance penetration of ink into substrate.
10. Buffering agent—to maintain pH within limits.

The type and quality of each of these components must be determined whilst still maintaining the overall characteristics of the ink required for ink jet printing. Some of these additives fulfil more than one function. A general requirement is that any organic compounds used should have fairly short polymer chains so as to allow complete and uniform break up into spherical droplets, Organic compounds with long polymer chains tend to cause 'stringing' i.e. the droplets form long strings of beads which prohibits satisfactory charging and printing.

Listed below are the composition (in weight parts) of three inks according to the present invention.

| | % Weight |
|---|---|
| Example 1. | |
| An ink containing 20% by volume of an inorganic pigment | |
| Inorganic green pigment - | 44.08 |
| mean particle size 0.5 microns | |
| Deionized Water | 42.38 |
| Dispex N40 (surfactant/dispersant) | 0.42 |
| Bentonite (suspending Agent) | 0.04 |
| Vinyacryl 7170 | 3.39 |
| 50% by wt. styrene acrylic | |
| copolymer suspension | |
| (binder/film former) | |
| Polyethlene glycol 200 (PEG) (humectant and | 8.47 |
| anti-wicking agent) | |
| E.D.T.A (chelating agent) | 0.21 |
| Acticide BG (biocide) | 0.08 |
| 50 Cst silicone oil (defoamer) | 0.04 |
| Alkyl glycol ether (substrate penetrant) | 0.85 |
| Sodium carbonate (buffer) | 0.04 |
| Example 2 | |
| An ink containing 10% by Volume of an inorganic pigment | |
| Inorganic green pigment | 32.55 |
| Deionized Water | 57.87 |
| Dispex N40 (surfactant/dispersant) | 0.36 |
| Polyethylene glycol 200 (PEG) (humectant and | 9.04 |
| anti-wicking agent) | |
| E.D.T.A. (chelating agent) | 0.18 |
| Example 3 | |
| An ink containing 20% by volume of an inorganic yellow pigment | |
| Inorganic yellow pigment | 47.02 |
| Deionized water | 33.36 |
| Isopropyl alcohol | 8.34 |
| Solsperce 20,000 (surfactant/dispersant) | 0.44 |
| Low molecular polyvinyl alcohol | 0.89 |
| (binder/film former) | |
| Polyethylene glycol 200 (humectant) | 4.44 |
| E.D.T.A (chelating agent) | 0.53 |
| Acticide BG (biocide) | 0.09 |
| 50 cst silicone oil (defoamer) | 0.01 |
| Polyethylene glycol 400 (anti-wicking agent) | 4.44 |
| Sodium carbonate (buffer) | 0.44 |

All these examples were used with a nozzle diameter of 50 microns and a modulation of $10^5$ Hz. The table below illustrates the properties of these inks and illustrates their suitability for use in ink jet printers

| | Example No. | | |
|---|---|---|---|
| | 1 | 2 | 3 |
| pH | 8.5 | 7.5 | 7.7 |
| Conductivity (μmhos/cm) | 3200 | 361 | 410 |
| Plastic viscosity (mPas) | 2.8 | 1.7 | 8.2 |
| Yield value (Pa) | 0 | 0.4 | 0 |

The invention thus provides a wide range of pigmented inks for use in ink jet printers for decorating ceramics and glass. Inks of the invention are particularly suited for use in printing on ceramic products where the ink may comprise in addition to a pigment a flux which must also meet the aforementioned particle size distribution requirements.

According to a preferred embodiment, the pigment of the ink is ferromagnetic to permit anything written therewith to be read by a magnetic sensor.

The inks outlined above are given for example purposes only and many other modifications may be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An ink comprising an inorganic pigment, wherein the ink is usable in an ink jet printer for printing onto ceramics or glass to provide a decoration thereon following subsequent firing, said ink further comprising a flux for preventing degradation of the ink during firing, the maximum particle size of the pigment and the flux being sufficiently small not to block the nozzles or the filters of the printer, and the particle size range being sufficiently narrow for the ink to have a low enough viscosity for the printer to operate.

2. An ink according to claim 1, wherein the median particle size of the pigment is between 0.2 and 2 microns.

3. An ink according to 1 or 2, wherein the pigment has a surface area of between 4 and 30 $m^2/g$.

4. An ink according to claim 1, wherein for use with a 50 micron nozzle the maximum particle size of the pigment is below 4 microns.

5. An ink according to claim 1, wherein for use with a 50 micron nozzle less than 20% of the particles of pigment are less than 0.2 microns.

6. An ink according to claim 1, wherein the pigments in the ink are other than carbon black or titania based.

7. An ink according to claim 1, wherein the proportion of pigment in the ink is in the range 1–85% by weight.

8. An ink according to claim 7, wherein the proportion of pigment in the ink is in the range 20–60% by weight.

9. An ink according to claim 1, wherein the ink comprises greater than 15% by weight of a medium.

10. An ink according to claim 9, wherein the medium is a polar solvent.

11. An ink according to claim 10, wherein the medium is any of water, methyl ethyl ketone, alcohol or a mixture of these.

12. An ink according to claim 1, wherein the ink comprises one or more of the following constituents in the range given:

| | WT. % |
|---|---|
| Surfactant/Dispersing agent | 0–20 |
| Suspending Agent | 0–20 |
| Film Former/Binder/Hardner | 0–20 |
| Humectant | 0–20 |
| Chelating agent | 0–1 |
| Biocide | 0–1 |
| Defoaming agent | 0–1 |
| Buffering agent | 0–1 |
| Anti wicking agent | 0–20 |
| or | |
| Substrate penetrant | 0–5. |

13. An ink according to claim 12, wherein the surfactants/dispersing agents are wetting agents.

14. An ink according to claim 12, wherein the surfactants/dispersing agents comprise, for aqueous systems, sodium polyphosphate, sodium carboxylic acid, and mixtures thereof.

15. An ink according to claim 12, wherein the surfactants/dispersing agents comprise, for organic systems, triethanolamine, a dimethylethanolamine salt, and mixtures thereof.

16. An ink according to claim 12, wherein the film formers/binders/hardener comprise one or more of resins, rosins, esterfied resins, acrylic, styrene acrylic, cellulose, amides, epoxies.

17. An ink according to claim 12, wherein the humectant is polyethylene glycol (PEG).

18. An ink according to claim 12, wherein the chelating agent comprises EDTA.

19. An ink according to claim 12, wherein the biocides comprise formalin.

20. An ink according to claim 12, wherein the biocides comprise one of the acticide range of biocides.

21. An ink according to claim 12, wherein the defoaming agents comprise low molecular weight silicones.

22. An ink according to claim 12, wherein the pigment is ferromagnetic to permit anything written therewith to be read by a magnetic sensor.

* * * * *